United States Patent [19]
Blair

[11] 3,854,429
[45] Dec. 17, 1974

[54] FERTILIZER DISPENSER
[76] Inventor: Calvin B. Blair, P.O. Box 76, Barnard, Kans. 67418
[22] Filed: Jan. 19, 1973
[21] Appl. No.: 325,175

[52] U.S. Cl. ................................................ 111/7
[51] Int. Cl. .......................................... A01c 23/02
[58] Field of Search .................. 111/7, 6, 73, 81, 85

[56] References Cited
UNITED STATES PATENTS

| | | | |
|---|---|---|---|
| 1,921,886 | 8/1933 | Kriegbaum | 111/73 |
| 2,781,733 | 2/1957 | Graham | 111/7 |
| 2,849,969 | 9/1958 | Taylor | 111/7 |
| 2,876,719 | 3/1959 | Holle | 111/7 |
| 3,605,657 | 9/1971 | Brannan | 111/7 |
| 3,618,538 | 11/1971 | Brannan | 111/7 |

*Primary Examiner*—Stephen C. Pellegrino
*Attorney, Agent, or Firm*—Fishburn, Gold & Litman

[57] ABSTRACT

Dry granular fertilizer or other dry materials are simultaneously and compatibly dispensed with anhydrous ammonia fertilizer by using a rearwardly open dispenser box located immediately behind a furrow-producing chisel plow. An anhydrous ammonia dispenser tube runs downwardly through the box and discharges just behind the chisel plow while the dry materials are dispensed into an open space formed behind the box by outwardly projecting wings and a sloping bottom wall, the wings and bottom wall simultaneously covering the furrow into which the ammonia is dispensed.

5 Claims, 2 Drawing Figures

PATENTED DEC 17 1974　　　　　　　　　　　　　　　　3,854,429

3,854,429

FERTILIZER DISPENSER

This invention relates to a drawn agricultural fertilizing implement and more particularly to such a device which permits the deep injection of anhydrous ammonia with minimum gas losses while simultaneously dispensing granular, dry fertilizers or like materials into the same furrow.

The application of dry granular fertilizer and anhydrous ammonia fertilizer have been considered separate and incompatible operations, even though it has been recognized that this is basically undesirable due to the extra compaction created in the field, and extra labor and expense involved. Some of the problems associated with the simultaneous dispensing of dry materials and anhydrous ammonia are related to the refrigeration effect of the expanding ammonia gas, tending to cause moisture condensation which promotes the sticking of the dry materials, and the necessarily rapid covering of the furrow into which the anhydrous ammonia is dispensed being incompatible with the desired broader distribution of granular fertilizer, seeds or the like.

The principal objects of the present invention are: to provide a fertilizing implement suitable for the simultaneous dispensing of anhydrous ammonia fertilizer and dry substances such as granular fertilizer and/or plant seeds; to provide such a device wherein the anhydrous ammonia is deposited into a deep trench and immediately covered without interfering with the simultaneous broadcasting into the furrow of dry materials; to provide such a device wherein the refrigerating effect of the expanding ammonia gasses does not produce conditions wherein sticking of the dry material is likely to occur; to provide such a device which produces a gap or void immediately behind the ammonia trench into which gap dry fertilizer or the like is suitably mixed with the soil in a relatively broad pattern; and to provide such a dispensing device which is compatible with existing chisel plows, is relatively simple in design, inexpensive to manufacture and extremely well suited for its intended purpose.

Other objects and advantages of this invention will become apparent from the following description taken in connection with the accompanying drawings wherein are set forth by way of illustration and example certain embodiments of this invention.

Figure 1:
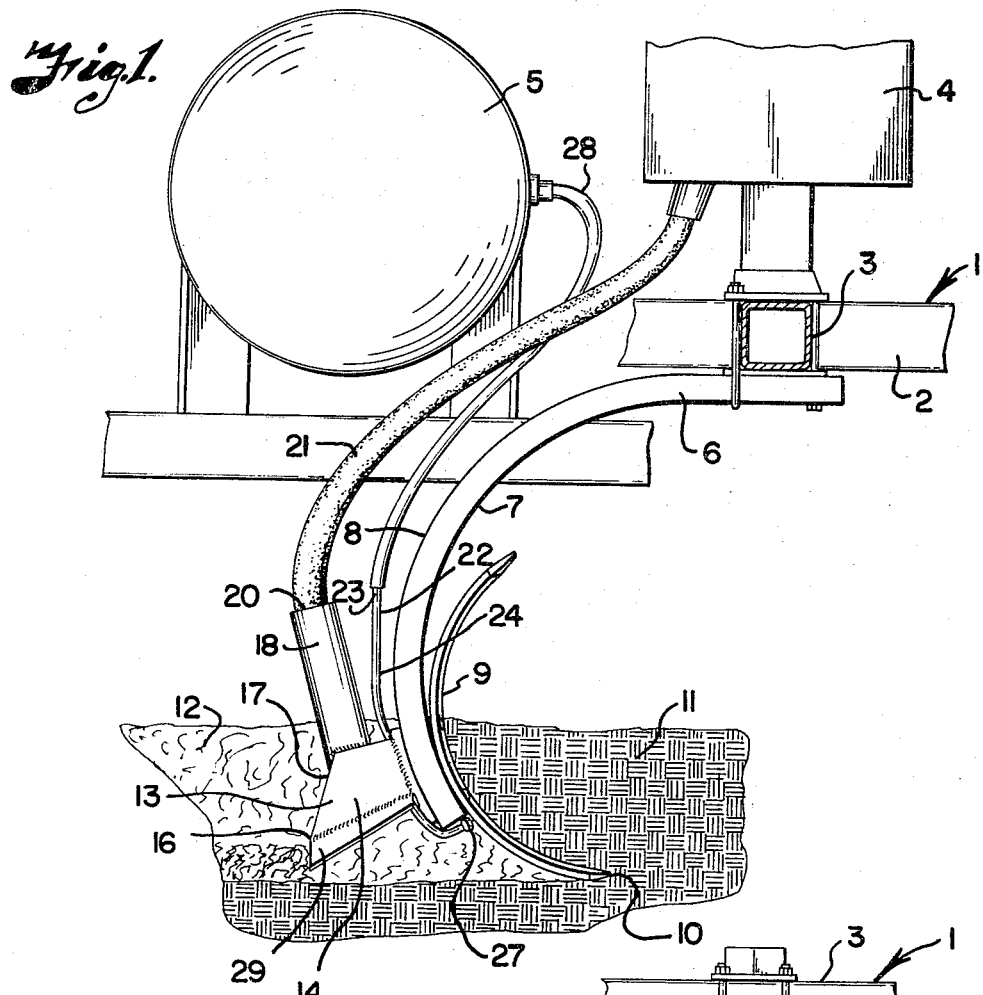
FIG. 1 is a fragmentary, partially cross-sectional, partially schematic, side elevational view showing a fertilizing implement embodying this invention in operational position.

Referring to the drawings in more detail:

The reference numeral 1 generally indicates a fertilizer dispensing arrangement embodying this invention. The arrangement 1 comprises a mobile frame 2 of any suitable, drawn agricultural implement of the type having a plow beam 3 and associated with a supply 4 of dry material to be dispensed, such as granular fertilizer and/or seed, and a supply 5 of anhydrous ammonia fertilizer. A curved tooth shank or support 6 is mounted on the beam 3 in the usual manner and exhibits a concave forward surface 7 and a convex trailing surface 8. A chisel plow tooth 9 is mounted on the support 6 at the lower end of the forward surface 7 and has a point 10 adapted to project into the soil 11 a substantial distance, for example 12 inches, and open a furrow 12 upon the forward motion of the frame 2.

A dispenser box 13 is preferably fabricated of rigid plate material, such as steel, and is suitably mounted on the convex surface 8 of the support 6 at an elevation above the point 10 but normally somewhat below the undisturbed surface of the soil 11. The box 13 is comprised of spaced-apart upwardly extending side walls 14 and 15 and a downwardly and rearwardly sloping bottom wall 16, but has an open rear 17.

A rigid, dry material dispensing tube 18 is secured, as by welding, to the dispenser box 13 and has a diameter substantially equal to the distance between the side walls 14 and 15. The dry material tube 18 has a lower end 19 opening in spaced relation above the bottom wall 16 and an upper end 20 projecting above the box 14. In this example, a flexible tube 21 is telescoped into the upper end 20 of the tube 18 and receives the dry material by means of a suitable dispensing system (not shown) associated with the supply 4.

Figure 2:
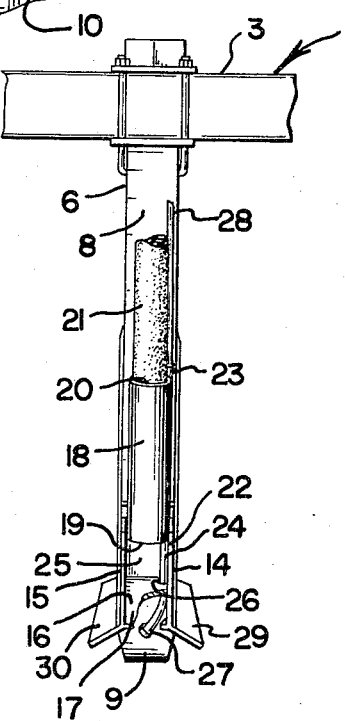
FIG. 2 is a fragmentary, rear elevation of the fertilizing implement.

An anhydrous ammonia tube 22, of substantially smaller diameter than the dry material tube 18 has an upper end 23 located above the box 14 and an intermediate portion 24 extending downwardly through the box and secured therein, for example, by soldering or welding. The portion 24 is preferably positioned in an inside corner of the box 13 formed by a side wall 14 and the box front wall 25 (FIG. 2) and projects past the bottom wall 16 through an opening 26. The tube 22 is relatively remote from the portion of the bottom wall 16 below the dry material tube end 19, so the refrigeration effect of the ammonia does not produce interfering condensation. The tube 22 has a lower end 27 terminating in a dispensing nozzle located closely behind the plow tooth 9, preferably near the transverse center thereof to avoid abrasion by the soil being moved by the tooth 9. A flexible tube 28 provides communication between the anhydrous ammonia source 5 and the upper end 23 of the dispensing tube 22.

Extensions or wings 29 and 30 are directed laterally outwardly of the side walls 14 and 15 at an elevation near the bottom wall 16 forming, with the bottom wall 16, a series of lower planing surfaces tending to cover and close the furrow just opened by the tooth 9 as it is drawn through the soil 11.

In operation, the tooth 9 is drawn through soil in the usual manner producing the furrow 12. Anhydrous ammonia is dispensed directly behind the tooth 10 into the furrow and the furrow is immediately covered through the planing action of the wings 29 and 30 and the downwardly and rearwardly sloping bottom wall 16. This same planing action of the wings 29 and 30 and the bottom wall 16 maintains a wide receiving void or space behind the dispenser box 13 for receiving dry granular material thereinto, such material being dispensed through the tube 18 from which it falls and is deflected rearwardly out the open rear 17 and into the void by the upper surface of the bottom wall 16.

Thus, both the liquid material and dry materials are optimally dispensed simultaneously with a desirable soil working operation.

It is to be understood that, while certain forms of this invention have been illustrated and described, it is not to be limited thereto except insofar as such limitations are included in the following claims.

I claim:

1. A fertilizing implement comprising:

a. an agricultural tool plow tooth support having a forward surface and a trailing surface,
b. a plow tooth mounted on said forward surface and having a point adapted to project into the soil and open a furrow upon the forward motion of said support,
c. a rearwardly open dispenser box mounted on said trailing surface and having spaced apart upwardly extending side walls and a bottom wall,
d. a dry material dispensing tube secured to said box and having a lower end opening above said bottom wall, dry material supply means communicating with said dispensing tube, an anhydrous ammonia tube extending downwardly past said box and having a lower end terminating behind said plow tooth, anhydrous ammonia supply means communicating with said ammonia tube,
e. said bottom wall sloping downwardly and rearwardly from said support and serving to close the portion of the furrow into which ammonia is dispensed while dry material is directed rearwardly from said box, and
f. wings directed laterally outwardly of said side walls near said bottom wall and adapted to cooperate with said bottom wall in closing said furrow portion.

2. The implement as set forth in claim 1 wherein:
a. said box is mounted at an elevation above said point.

3. The implement as set forth in claim 1 wherein:
a. said anhydrous ammonia tube extends downwardly through said box and through said bottom wall at a position remote from the area of contact by said dry material.

4. A fertilizing implement comprising:
a. a furrow producing member having a front portion and a rear portion, anhydrous ammonia supply means,
b. means connected to said ammonia supply means and located rearwardly of said furrow producing member for dispensing anhydrous ammonia behind said furrow producing member and in said furrow,
c. a furrow closing member positioned behind said anhydrous ammonia dispensing means and having walls rearwardly enclosing the portion of the furrow into which ammonia is dispensed,
d. means associated with said furrow closing member for dispensing dry material rearwardly thereof, dry material supply means connected to said means associated with said furrow closing member,
e. said furrow closing member being a rearwardly open box, said walls including a downwardly and rearwardly sloping well forming the bottom of said box, selected furrow closing member walls forming laterally extending wings.

5. The implement as set forth in claim 4 wherein:
a. said anhydrous ammonia dispensing means comprises a tube extending downwardly through said bottom wall.

* * * * *